US010375097B2

(12) United States Patent
Kopp et al.

(10) Patent No.: US 10,375,097 B2
(45) Date of Patent: Aug. 6, 2019

(54) IDENTIFYING SELF-SIGNED CERTIFICATES USING HTTP ACCESS LOGS FOR MALWARE DETECTION

(71) Applicant: Cisco Technology, Inc., San Jose, CA (US)

(72) Inventors: Martin Kopp, Beroun (CZ); Martin Grill, Prague (CZ); Jan Kohout, Roudnice Nad Labem (CZ)

(73) Assignee: Cisco Technology, Inc., San Jose, CA (US)

( * ) Notice: Subject to any disclaimer, the term of this patent is extended or adjusted under 35 U.S.C. 154(b) by 191 days.

(21) Appl. No.: 15/386,006

(22) Filed: Dec. 21, 2016

(65) Prior Publication Data
US 2018/0176240 A1    Jun. 21, 2018

(51) Int. Cl.
*H04L 29/06* (2006.01)
*H04L 9/32* (2006.01)

(52) U.S. Cl.
CPC ........ *H04L 63/1425* (2013.01); *H04L 9/3263* (2013.01); *H04L 63/0428* (2013.01); *H04L 63/0823* (2013.01); *H04L 63/145* (2013.01); *H04L 63/1416* (2013.01); *H04L 63/166* (2013.01)

(58) Field of Classification Search
CPC ............ H04L 63/1425; H04L 63/0428; H04L 63/0823; H04L 63/1416; H04L 63/145; H04L 63/166; H04L 9/3263
See application file for complete search history.

(56) References Cited

U.S. PATENT DOCUMENTS

| 7,634,811 | B1 | 12/2009 | Kienzle et al. |
| 7,739,494 | B1 * | 6/2010 | McCorkendale ... H04L 63/0823 713/152 |
| 8,429,734 | B2 | 4/2013 | Agbabian et al. |
| 9,288,190 | B1 * | 3/2016 | Brinskelle ........... H04L 63/0823 |
| 9,407,644 | B1 | 8/2016 | Cheng et al. |
| 9,419,942 | B1 | 8/2016 | Buruganahalli et al. |
| 2014/0298420 | A1 * | 10/2014 | Barton .................... H04L 63/10 726/4 |

(Continued)

OTHER PUBLICATIONS

Anderson, Blake., "Hiding in Plain Sight: Malware's Use of TLS and Encryption", Cisco Blog—Security, http://blogs.cisco.com/security/malwares-use-of-tls-and-encryption, 4 pages, Jan. 25, 2016, Cisco.

(Continued)

*Primary Examiner* — Meng Li
(74) *Attorney, Agent, or Firm* — Behmke Innovation Group LLC; James Behmke; Stephen D. LeBarron

(57) ABSTRACT

In one embodiment, a device in a network receives traffic information regarding one or more secure sessions in the network. The device associates the one or more secure sessions with corresponding certificate validation check traffic indicated by the received traffic information. The device makes a self-signed certificate determination for an endpoint domain of a particular secure session based on whether the particular secure session is associated with certificate validation check traffic. The device causes the self-signed certificate determination for the endpoint domain to be used as input to a malware detector.

17 Claims, 8 Drawing Sheets

(56) References Cited

U.S. PATENT DOCUMENTS

| | | | |
|---|---|---|---|
| 2016/0080404 A1* | 3/2016 | Kohout | H04L 63/1425 726/23 |
| 2016/0285861 A1 | 9/2016 | Chester | |
| 2016/0359842 A1* | 12/2016 | Solodovnikov | G06F 21/56 |

OTHER PUBLICATIONS

Chuat, et al., "Efficient Gossip Protocols for Verifying the Consistency of Certificate Logs", Communications and Network Security (CNS), 2015 IEEE Conference, arXiv:1511.01514v1 [cs.CR], 9 pages, Sep. 28-30, 2015, arXiv.

Law, Eric., "Understanding Certificate Revocation Checks", https://blogs.msdn.microsoft.com/ieinternals/2011/04/07/understanding-certificaterevocation-checks/, IEInternals, 6 pages, Apr. 7, 2011, Microsoft.

https://en.wikipedia.org/wiki/Certificate_revocation_list; Wikipedia; Certificate revocation list; pp. 1-4.

https://en.wikipedia.org/wiki/Online_Certificate_Status_Protocol; Wikipedia; Online Certificate Status Protocol; pp. 1-4.

European Search Report dated Jan. 18, 2018 in connection with European Application No. 17 20 7688.

Blake Anderson et al.: "Identifying Encrypted Malware Traffic with Contextual Flow Data", Artificial Intelligence and Security, ACM, 2 Penn Plaza, Suite 701, New York, NY, 10121-0701, USA, Oct. 28, 2016; pp. 35-46.

Blake Anderson et al.: "Deciphering Malware's Use of TLS (without Decryption)", arxiv.org, Cornell University Library, 201 Olin Library, Cornell University, Ithaca, NY 14853, Jul. 6, 2016.

Ietf: "RFC 5280—Internet X.509 Public Key Infrastructure Certificate and Certificate Revocation List (CRL) Profile", May 1, 2008, Retrieved from the Internet: URL:https://tools.ietf.org/html/rfc5280 [retrieved on Aug. 25, 2015].

* cited by examiner

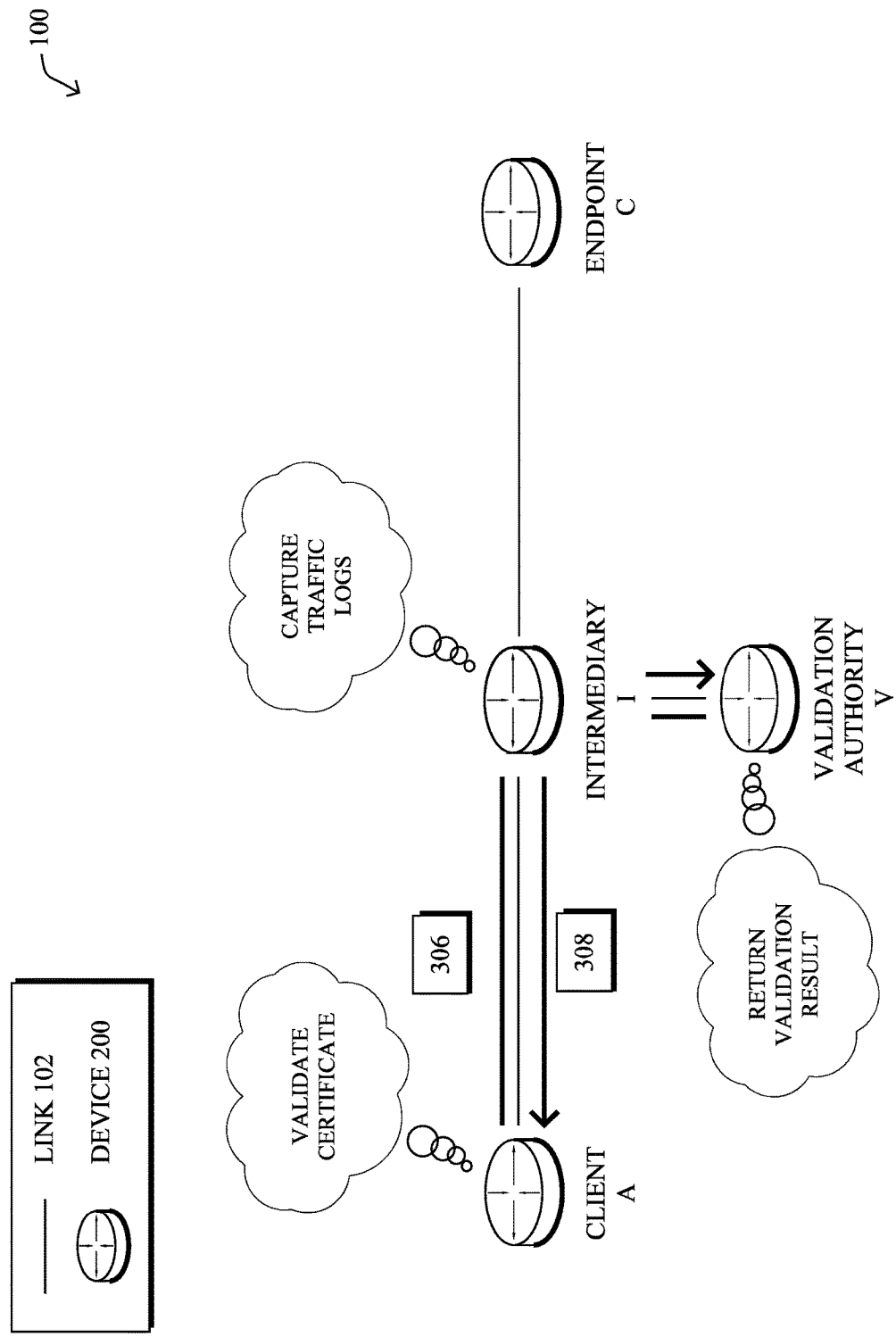

IDENTIFYING SELF-SIGNED CERTIFICATES USING HTTP ACCESS LOGS FOR MALWARE DETECTION

TECHNICAL FIELD

The present disclosure relates generally to computer networks, and, more particularly, to identifying self-signed certificates using Hypertext Transfer Protocol (HTTP) access logs for malware detection.

BACKGROUND

Malicious or otherwise undesirable network traffic can take many different forms. For example, some traffic may seek to overwhelm a service by sending a large number of requests to the service. Such attacks are also sometimes known as denial of service (DoS) attacks. Other forms of malicious traffic may seek to exfiltrate sensitive information from a network, such as credit card numbers, trade secrets, and the like. Typically, such traffic is generated by a client that has been infected with malware. Thus, a further type of malicious network traffic includes network traffic that propagates the malware itself. Additionally, some network traffic may simply be deemed inappropriate for a particular network.

Intrusion prevention systems (IPS), next-generation firewalls, and flow monitoring systems generally attempt to detect and block malicious traffic, whenever possible. However, in recent years, the amount of encrypted and evasive network traffic has increased considerably. Notably, with the advent of transport layer security (TLS) and other security mechanisms, many websites are now encrypting even traditional webpage data. This presents certain challenges to traditional security systems as the contents of the traffic may not be available for analysis and pattern matching is generally inapplicable to encrypted traffic.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 3A-3D illustrate an example of the use of Hypertext Transfer Protocol (HTTP) access logs to identify domains that use self-signed certificates;

DESCRIPTION OF EXAMPLE EMBODIMENTS

Overview

According to one or more embodiments of the disclosure, a device in a network receives traffic information regarding one or more secure sessions in the network. The device associates the one or more secure sessions with corresponding certificate validation check traffic indicated by the received traffic information. The device makes a self-signed certificate determination for an endpoint domain of a particular secure session based on whether the particular secure session is associated with certificate validation check traffic. The device causes the self-signed certificate determination for the endpoint domain to be used as input to a malware detector.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1:
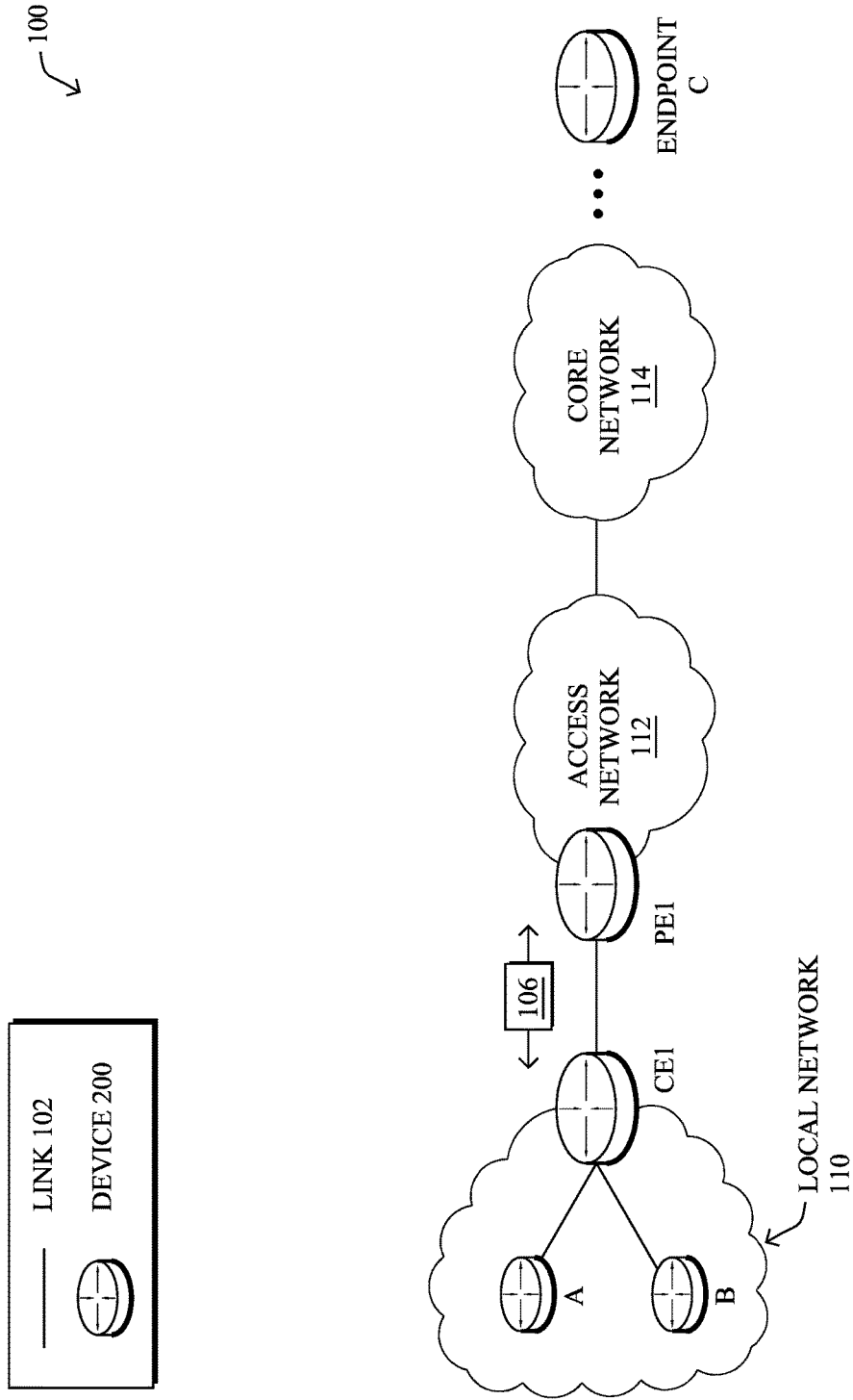
FIG. 1 illustrates an example communication network.

FIG. 1 is a schematic block diagram of an example communication network 100 illustratively comprising nodes/devices 200, such as a plurality of routers/devices interconnected by links and/or networks, as shown. For example, a customer edge (CE) router CE1 may interconnect nodes A and B on a local network 110 with a provider edge (PE) router PE1 of an access network 112. In turn, access network 112 may provide local network 110 with connectivity to a core network 114, such as the Internet.

The various nodes/devices 200 may exchange data packets 106 (e.g., traffic/messages) via communication network 100 over links 102 using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity. For example, node A in local network 110 may communicate with an endpoint node/device C (e.g., a remote server, etc.) via communication network 100.

As would be appreciated, links 102 may include any number of wired and/or wireless connections between devices. For example, node A may communicate wirelessly using a WiFi™ connection, CE1 and PE1 may communicate wirelessly using a cellular connection or via a hardwired connection (e.g., DSL, etc.), etc. In addition, while certain devices are depicted in FIG. 1, the view shown is a simplified view of communication network 100. In other words, communication network 100 may also include any number of intermediary networking devices such as, but not limited to, routers, switches, firewalls, etc., that are not shown.

In various embodiments, nodes/devices 200 may employ a secure communication mechanism, to encrypt and decrypt data packets 106. For example, nodes/devices 200 shown may use a Transport Layer Security (TLS) mechanism, such as the HTTP Secure (HTTPS) protocol, to encrypt and decrypt data packets 106.

Figure 2:
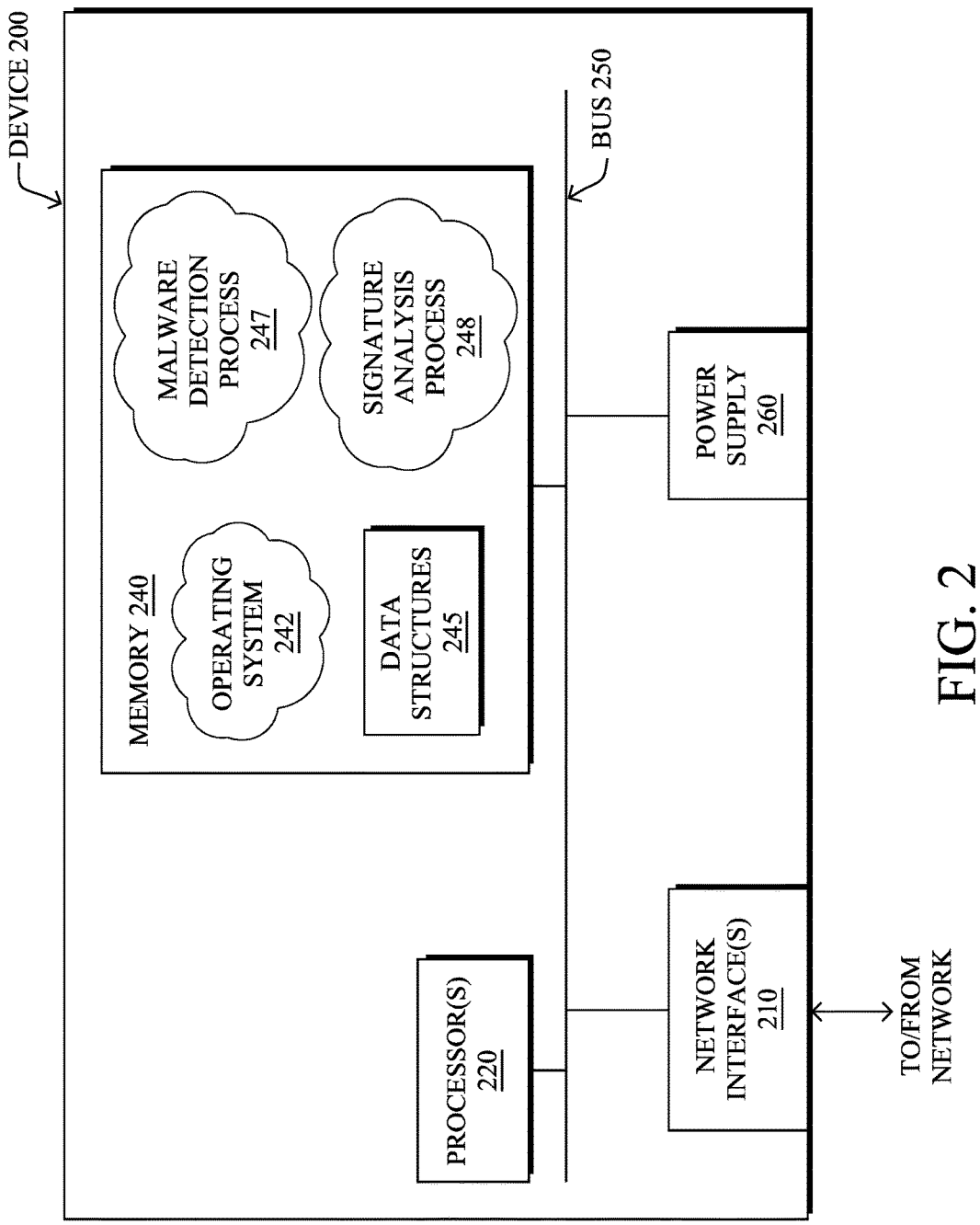
FIG. 2 illustrates an example network device/node.

FIG. 2 is a schematic block diagram of an example node/device 200 that may be used with one or more embodiments described herein, e.g., as any of the computing devices shown in FIG. 1, any other computing device that supports the operations of network 100 (e.g., switches, etc.), or any of the other devices referenced below. The device 200 may also be any other suitable type of device depending upon the type of network architecture in place. As shown, device 200 comprises one or more network interface(s) 210, one or more processor(s) 220, and a memory 240 interconnected by a system bus 250 and powered by a power supply 260.

The network interface(s) 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interface(s) 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a malware detection process 247 and/or a signature analysis process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, malware detection process 247 may employ machine learning and/or detection rules, to detect the presence of malware in the network. For example, malware detection process 247 may classify traffic in the network (and its corresponding application or client node) as being either benign or malware-related. In one embodiment, malware detection process 247 may assess captured traffic data to determine whether a given traffic flow or set of flows are caused by malware in the network, such as a particular family of malware applications. Example forms of traffic that can be caused by malware may include, but are not limited to, traffic flows reporting exfiltrated data to a remote entity, spyware or ransomware-related flows, command and control (C&C) traffic that oversees the operation of the deployed malware, traffic that is part of a network attack, such as a zero day attack or denial of service (DoS) attack, combinations thereof, or the like. In further embodiments, malware detection process 247 may classify the gathered traffic data to detect other anomalous behaviors (e.g., malfunctioning devices, misconfigured devices, etc.), traffic pattern changes (e.g., a group of hosts begin sending significantly more or less traffic), or the like.

Malware detection process 247 may employ any number of machine learning techniques to assess the gathered traffic data. In general, machine learning is concerned with the design and the development of techniques that receive empirical data as input (e.g., traffic data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function is a function of the number of misclassified points. The learning process then operates by adjusting the parameters a,b,c such that the number of misclassified points is minimal. After this optimization/learning phase, detection process 247 can use the model M to classify new data points, such as information regarding new traffic flows in the network. Often, M is a statistical model, and the cost function is inversely proportional to the likelihood of M, given the input data.

In various embodiments, malware detection process 247 may employ one or more supervised, unsupervised, or semi-supervised machine learning models. Generally, supervised learning entails the use of a training set of data, as noted above, that is used to train the model to apply labels to the input data. For example, the training data may include sample traffic data that is "normal," or "malware-generated." On the other end of the spectrum are unsupervised techniques that do not require a training set of labels. Notably, while a supervised learning model may look for previously seen attack patterns that have been labeled as such, an unsupervised model may instead look to whether there are sudden changes in the behavior of the network traffic. Semi-supervised learning models take a middle ground approach that uses a greatly reduced set of labeled training data.

Example machine learning techniques that malware detection process 247 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, autoencoders, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as malware-generated, anomalous, etc. Conversely, the false negatives of the model may refer to the number of traffic flows that the model incorrectly classifies as normal, when actually malware-generated, anomalous, etc. True negatives and positives may refer to the number of traffic flows that the model correctly classifies as normal or malware-generated, etc., respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, malware detection process 247 may assess the captured traffic data on a per-flow basis. In other embodiments, malware detection process 247 may assess traffic data for a plurality of traffic flows based on any number of different conditions. For example, traffic flows may be grouped based on their sources, destinations, temporal characteristics (e.g., flows that occur around the same time, etc.), combinations thereof, or based on any other set of flow characteristics.

As noted above, botnets represent a particular security concern for network administrators. Once a client device has been infected with malware for the botnet, it may communicate with a command and control (C&C) server which sends control commands to the infected device. For example, a C&C server may issue commands to many malware-infected devices, to instruct the infected devices to launch a coordinated DDoS attack on a particular target.

Encryption is increasingly being used to conceal malware-related traffic. For example, a large number of malware reports indicate that ongoing advanced persistent threat (APT) campaigns use Transport Layer Security (TLS) to encrypt network communications between an infected client device and the C&C servers. From analysis of encrypted traffic that is malware-related, the inventors herein have observed that the security certificates used for malware-related traffic are also typically self-signed. This is in contrast to security certificates that are signed by a trusted certification authority.

Two reasons may exist for malicious traffic using self-signed certificates. First, self-signed certificates are free, whereas certification authority-signed certificates are not. Second, to obtain a certificate signed by a certification authority, the attacker/malicious entity would need to provide an identity to the certification authority for verification. Naturally, an attacker/malicious entity would want to remain as anonymous as possible, to avoid criminal penalties.

With respect to self-signed certificates, most web browsers now display a security alert since self-signed certificates are not verified by a trusted CA. Often, the alert advises the user to abort the webpage for security reasons (e.g., by displaying a message that the page is untrusted). Consequently, Internet users tend to avoid browsing sites that use self-signed certificates. In contrast, however, non-browser applications and/or malware may not be as regulating and continue to establish connections with servers that use self-signed certificates. Accordingly, the use of self-signed certificates by websites and domains may be an indicator of malicious activity.

Identifying Self-Signed Certificates using HTTP Access Logs for Malware Detection The techniques herein allow for the identification of domains that use self-signed certificates based only on the HTTP access logs regarding the secure session. In some aspects, the techniques herein may analyze certificate validation checks in the access logs, to identify whether the domain of the secure session issued a self-signed certificate or not. More specifically, if the receiving client of a certificate for a secure session does not perform a subsequent validation check (e.g., by issuing a validation request to a validation authority), this is a strong indication that the certificate was self-signed by the corresponding domain. By modeling the HTTP logs surrounding the HTTP Secure (HTTPS) requests to each domain, the techniques are able to distinguish self-signed certificates with high precision. In further aspects, the self-signature decision may be used as input to a malware detection process, e.g., as one of the factors assessed by the detector.

Specifically, according to one or more embodiments of the disclosure as described in detail below, a device in a network receives traffic information regarding one or more secure sessions in the network. The device associates the one or more secure sessions with corresponding certificate validation check traffic indicated by the received traffic information. The device makes a self-signed certificate determination for an endpoint domain of a particular secure session based on whether the particular secure session is associated with certificate validation check traffic. The device causes the self-signed certificate determination for the endpoint domain to be used as input to a malware detector.

Illustratively, the techniques described herein may be performed by hardware, software, and/or firmware, such as in accordance with the signature analysis process 248, which may include computer executable instructions executed by the processor 220 (or independent processor of interfaces 210) to perform functions relating to the techniques described herein, e.g., in conjunction with malware detection process 247.

Figure 3A:
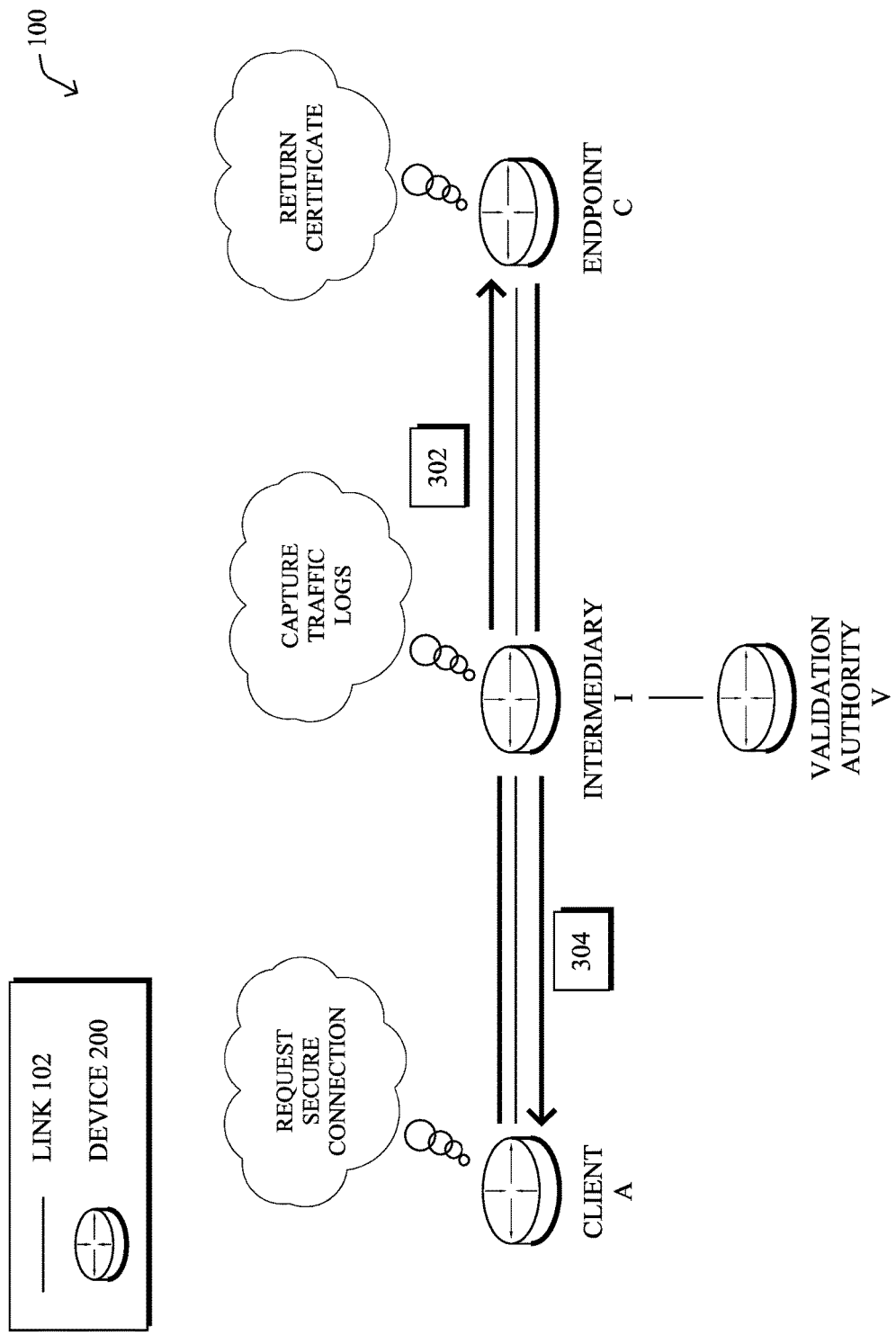

Operationally, FIGS. 3A-3D illustrate an example of the use of HTTP access logs to identify domains that use self-signed certificates, according to various embodiments. As shown in FIG. 3A, network 100 may include an endpoint client node/device A, an endpoint node/device C (e.g., a server), and an intermediary node/device I located therebetween. For example, the intermediary device I may be a router, switch, firewall, intrusion detection system (IDS), intrusion prevention system (IPS), proxy server, or other networking device through which traffic exchanged between nodes/device A and C may flow.

A simplified example of the establishment of a secure session between devices A and C is also shown in FIG. 3A. First, client A may send a request 302 to endpoint C to establish a secure session/connection. As would be appreciated, client A may perform a domain name system (DNS) lookup for the domain of endpoint C, prior to sending request 302, if the address of endpoint C is not already known. In other words, client A may initiate handshaking with endpoint C during which client A and endpoint C may exchange the information needed to securely communicate with one another. For example, request 302 may be a 'hello' message that indicates the ciphersuites supported by client A, a random number, or other such handshaking information.

In response to receiving request 302, endpoint C may send a response 304 to client A that includes its security certificate. As noted previously, two possibilities exist with respect to the signature on the certificate. In some cases, the security certificate may be signed by a certification authority. Such may be the case if the entity associated with the domain of endpoint C first proved his or her identity to the certification authority and paid a fee. The other possibility, as noted previously, is that the security certificate sent by endpoint C to client A is self-signed. In such a case, the certificate may instead be signed by the entity associated with endpoint C to certify its own identity (e.g., as opposed to certification from a third party certification authority). Example security certificates may include, but are not limited to, Secure Socket Layer (SSL) certificates, X.509 certificates, public key infrastructure (PKI) certificates, or the like.

Intermediary device I may capture traffic information regarding the exchange between client A and endpoint C. For example, intermediary device I may capture information regarding the address of client A, the address of endpoint C, the domain of endpoint C, the ciphersuite in use, timing information (e.g., when client A sent request 302, etc.), or any other information available from the data exchange between client A and endpoint C.

As shown in FIG. 3B, after receiving the certificate from endpoint C, client A may attempt to validate the certificate using a validation authority, if the certificate was signed by a certification authority. Notably, if a domain uses such an SSL certificate, a browser on the client will then typically verify that the signature from the certification authority is still valid and not revoked. For example, client A may send a certificate validation request 306 to validation authority device V via intermediary device I. In some cases, the validation authority may be issuing certification authority itself. In other cases, however, the validation authority may be kept separate so that previously issued certificates can still be validated, even if the certification authority is unavailable.

Validation request 306 may use any of several different HTTP protocols to perform the certificate validation (e.g., PKI, etc.). One such protocol is the Online Certificate Status Protocol (OCSP) which is used to check the revocation status of X.509 certificates. In such a case, the validation authority VA may be viewed as an OCSP responder. Another validation approach would be to use Certificate Revocation List (CRL) downloads. In general, CRLs are lists of certificates that have been revoked by their issuing certification authorities. OCSP and CRL downloads work in a similar manner, but with OCSP responses including less overall information than that of a CRL download. As would be appreciated, validation request 306 may take the form of any other validation protocol/mechanism, as desired.

In response to receiving request 306, the validation authority V may return a validation result 308 to client A. In turn, client A is now able to determine whether the certification authority-signed certificate sent by endpoint C is indeed valid. If so, client A may continue the handshaking process and establish a secure session with endpoint C (e.g., by exchanging cryptographic data with endpoint C, etc.).

Similar to the initial request/response between client A and endpoint C, intermediary device I may also capture HTTP information regarding the validation exchange between client A and validation authority V. For example, intermediary device I may capture address information for client A, address information for validation authority V, timing information (e.g., when client A sent validation request 306, etc.), information regarding the certificate validation protocol/mechanism in use, or any other information regarding the validation exchange. Such validation requests can be thus be recognized in the HTTP access log data (e.g., using their signatures—typical patterns in uniform resource locators (URLs) such as file name extensions or MIME types, etc.). In this way, intermediary device I may capture HTTP traffic logs for both the initial client A-endpoint C exchange, as well as the subsequent validation exchange between client A and validation authority V.

Figure 3C:
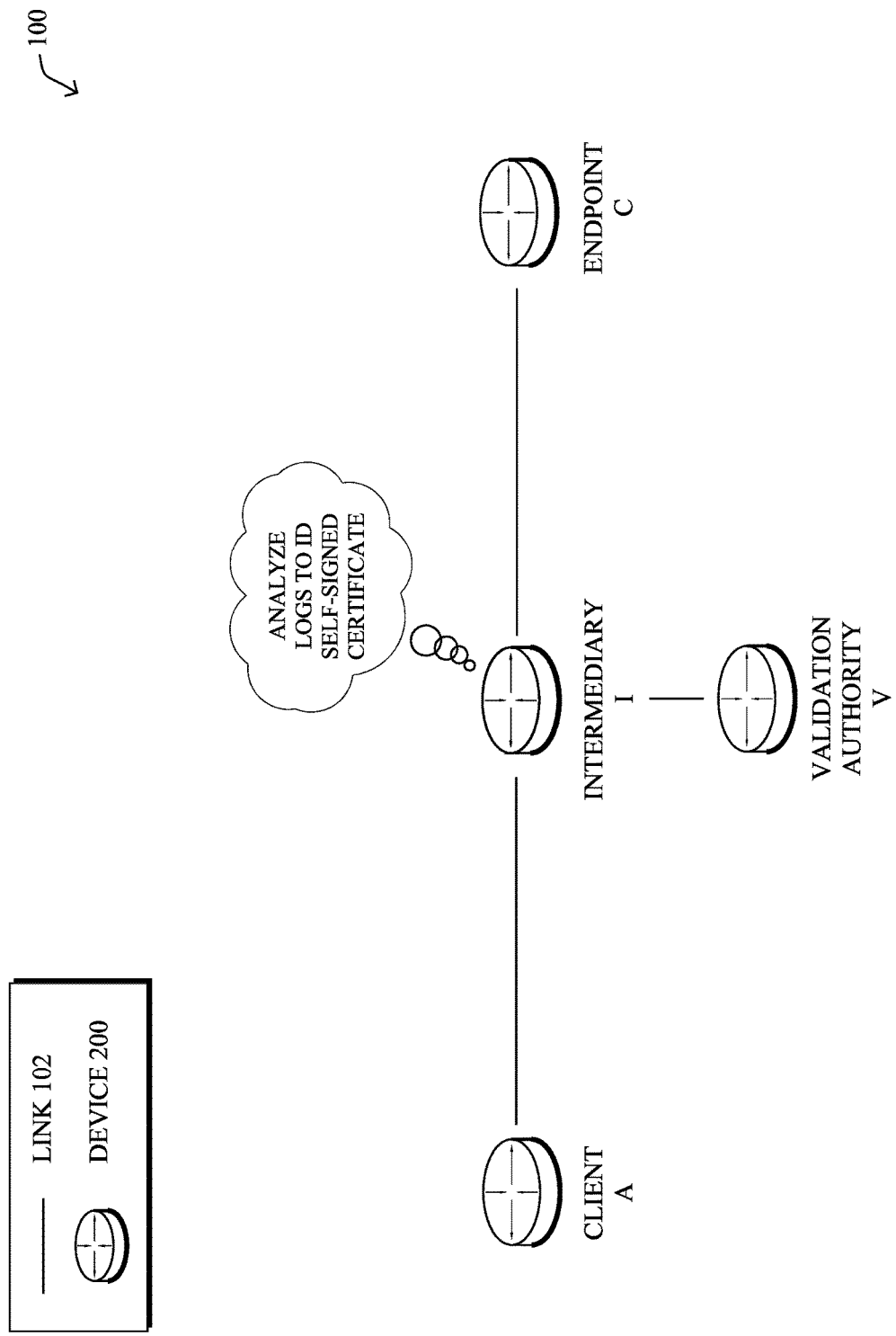

As shown in FIG. 3C, intermediary device I may analyze its HTTP access log data, to determine whether the certificate used by the domain of endpoint C was self-signed. Notably, if the certificate used by endpoint C was self-signed, it is not expected for there to be associated certificate validation check traffic from client A. By analyzing the HTTP logs in this manner, intermediary device I can make a determination as to whether or not the certificate used by endpoint C was self-signed. In other embodiments, intermediary device I may provide the captured traffic information to another device that performs this analysis. For example, intermediary device I (or a plurality of such intermediaries) may provide HTTP access logs to another analysis device for purposes of identifying self-signed certificates.

Figure 3D:
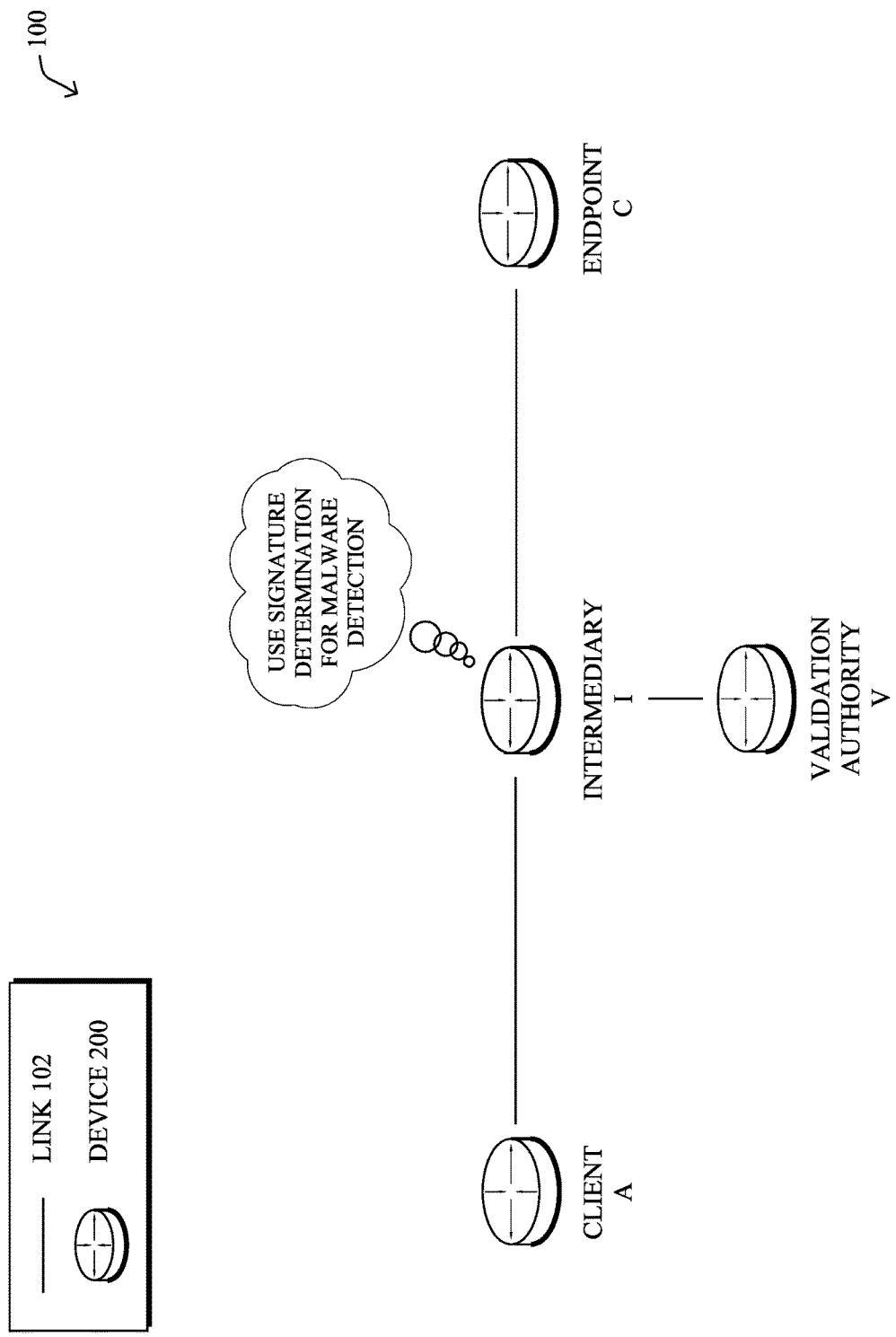

As shown in FIG. 3D, based on the self-signed certificate determination for the certificate from endpoint C, intermediary device I (or another device) may use this determination as a factor when detecting the presence of malware in the network. Other factors that the malware detector may consider could include, but are not limited to, metrics regarding the traffic itself (e.g., packet length and time information, associated applications, etc.), DNS information regarding the domain of endpoint C (e.g., whether the domain was generated by a domain generation algorithm (DGA), etc.), header information from the exchange between client A and endpoint C, and the like.

Figure 4:
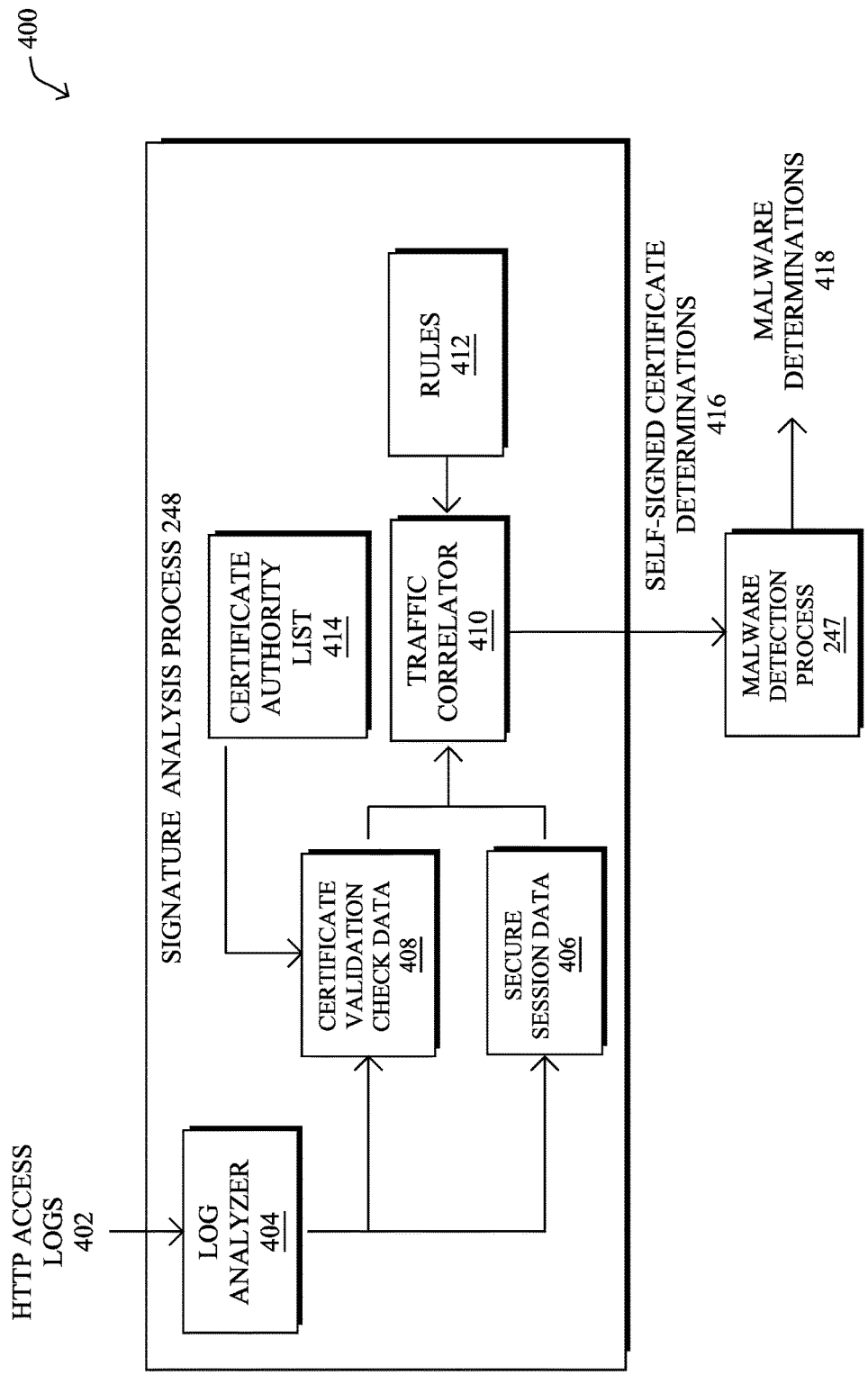
FIG. 4 illustrates an example architecture to identify self-signed certificates for malware detection.

FIG. 4 illustrates an example architecture 400 to identify self-signed certificates for malware detection, according to various embodiments. As shown, signature analysis process 248 may include a number of sub-processes and access storage locations, either on a local device (e.g., device 200) or across a plurality of devices that implement signature analysis process 248.

In some embodiments, signature analysis process 248 may include a log analyzer 404 that receives HTTP access logs 402. Such logs may be captured by one or more intermediary devices between any number clients and endpoints/domains. More specifically, access logs 402 may comprise traffic information regarding one or more secure sessions in the network (e.g., handshake traffic, certificate validation traffic, etc.).

Log analyzer 404 may be configured to parse out secure session data 406 and certificate validation check data 408 from HTTP access logs 402. Secure session data 406 may include, for example, data indicative of the clients and domains involved in secure sessions in the network, timing information for the secure sessions (e.g., when a secure sessions was requested or established, etc.), or any other information that can be captured from the HTTP traffic associated with a secure session.

Likewise, certificate validation check data 408 may include any information regarding the HTTP-based certificate validation check traffic. For example, certificate validation check data 408 may include information indicative of the clients that issued the validation check requests, the validation authorities queried, timing information regarding the validation check traffic (e.g., when a client sent a validation request, etc.), or any other information available from HTTP access logs 402 regarding certificate validation request. Log analyzer 404 may, for example, identify traffic information from HTTP access logs 402 that conform to a known certificate validation protocol/mechanism (e.g., OCSP, CRL downloads, etc.), by comparing the validation authorities to a known list of common certification or validation authorities (e.g., certificate authority list 414), or the like.

According to various embodiments, signature analysis process 248 may include a traffic correlator 410 configured to correlate secure session data 406 with certificate validation check data 408. Based on the correlations, traffic correlator 410 may generate and provide self-signed certificate determinations 416 to malware detection process 247 which may be executed on the same local device or another device in the network.

In some embodiments, traffic correlator 410 may employ any number of heuristic rules 412, to determine whether a particular domain likely issued a self-signed certificate. For example, rules 412 may be heuristics without 100% precision to increase their recall because, as described below, traffic correlator 410 may base a determination 416 on a plurality of visits to the corresponding domain, to suppress possible errors. Generally, traffic correlator 410 may determine whether or not a given client that requested a secure session subsequently performed a validation of the certificate (e.g., within a predefined timeframe of one another, etc.), based on data 406-408.

In some cases, a certificate check might not be always present in the logs even if the domain is using a properly signed certificate. For example, if the information about the certificate has already been cached by the browser application of the client, the browser is unlikely to generate certificate validation check traffic. Thus, in some embodiments, traffic correlator 410 may combine and assess traffic information from visits to the domain under scrutiny by a plurality of clients and over a longer period of time, to determine whether the domain uses a self-signed certificate. For example, if there is at least one client that generated certificate validation check traffic that is associated with a secure session request from that client and involving the domain, traffic correlator 410 may determine that the domain issued a certificate signed by a certification authority. Otherwise, traffic correlator 410 may determine that the domain issued a self-signed certificate (e.g., if none of the clients involved in secure sessions with the domain sent certificate validation requests).

Malware detection process 247 may use the self-signed certificate determinations 416 as input, to generate malware determinations 418. In turn, malware determinations 418 can be used by the malware detector to initiate one or more mitigation actions in the network. For example, if a particular domain is flagged as malware-related, the malware detector may block traffic to this domain. Similarly, if a particular client is found to have contacted one or more malware-related domains, the malware detector may send an alert (e.g., to a network administrator) to initiate corrective actions.

By way of non-limiting example of the operation of architecture 400, consider the case of a client device visiting twitter.com. Such a visit is typically accompanied by a certificate check to verify the certificate at the issuer. Thus, the HTTP access logs may capture the following URLs:

https://twitter.com
http://ocsp2.globalsign.com/gsalphasha2g2/MFMwUT-BPMEOwSzAJBgUrDgMC
GgUABBSE1Wv4CYvTB7dm2OHrrWWWqmtnYQQ-U9c3VPAhQ%2BWpPOreX2laD5mn
SaPcCEhEhQy17zc7ooUokaeXd8t99CQ%3D%3D From the HTTP access logs 402, log analyzer 404 may parse out the secure session data 406 regarding the traffic to the first URL (e.g., the address of the client that requested the URL, timing information regarding the request, etc.) and the certificate validation check data 408 regarding the traffic to the second URL. By assessing this data, traffic correlator 410 may determine that the same client sent traffic to both URLs within a predefined timespan of one another, thereby indicating that the client performed a validation check on the certificate issued by the first URL. Based on this, traffic correlator may determine that the domain of the first URL used a certificate signed by a certification authority.

Figure 5:
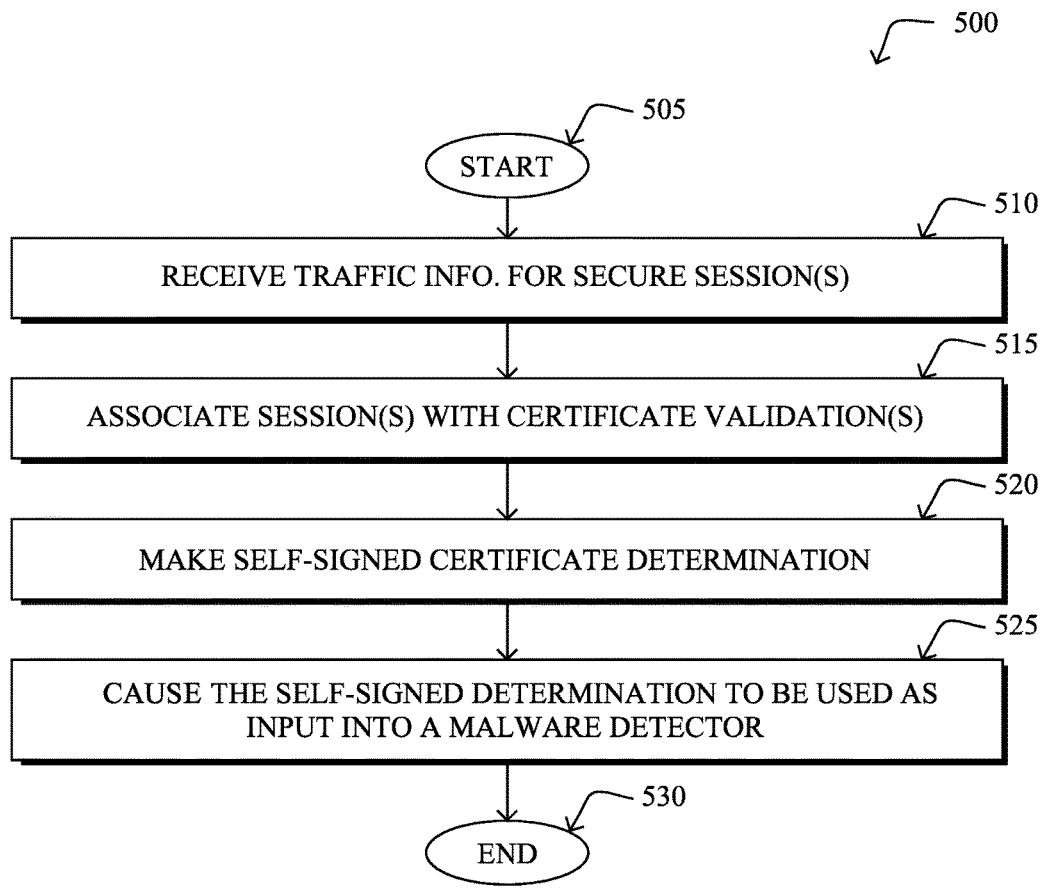
FIG. 5 illustrates an example simplified procedure for identifying self-signed certificates for malware detection.

FIG. 5 illustrates an example simplified procedure for identifying self-signed certificates for malware detection, in accordance with the teachings herein. For example, a non-generic, specifically configured device (e.g., device 200) may perform procedure 400 by executing stored instructions (e.g., process 247 and/or process 248). The procedure 500 may start at step 505, and continues to step 510, where, as described in greater detail above, the device may receive traffic information regarding one or more secure sessions in the network. For example, the device may receive captured HTTP access log data regarding traffic flows before, during, and/or after a secure session is established between a client in the network and an endpoint domain.

At step 515, as detailed above, the device may associate the one or more secure sessions with corresponding certificate validation check traffic indicated by the received traffic information. For example, the device may match the client address that requested a secure session with a client address from the certificate validation check traffic (e.g., the same client both requested a secure session and performed a certificate validation check). In some embodiments, the device may make such associations based on the timing of the secure session request/handshake and the certificate validation check traffic (e.g., if the same client sent both types of traffic within a predefined timespan).

At step 520, the device may make a self-signed certificate determination for an endpoint domain of a particular secure session based on whether the particular secure session is associated with certificate validation check traffic, as described in greater detail above. Notably, if the client involved in the particular secure session also generated certificate validation check traffic associated with the secure session, the device may determine that the certificate used by the domain was signed by a certification authority. Conversely, if the device finds no such association between the session and a validation check by the client, the device may determine that the endpoint domain of the secure session used a self-signed certificate. In further embodiments, the device may base self-signed certificate determination for the domain on a plurality of secure sessions. For example, if none of the secure sessions with the domain are associated with certificate validation check traffic (e.g., across multiple clients, etc.), the device may determine that the domain uses self-signed certificates.

At step 525, as detailed above, the device may cause the self-signed certificate determination to be used as input to a malware detector. In some cases, the malware detector may be executed by the device itself. In other cases, the device may provide the self-signed certificate determination to another device in the network that acts as a malware detector. Such a malware detector may use rules, machine learning, or any other malware analysis technique to determine whether the corresponding domain is associated with malware. Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the detection of self-signed certificates based solely on HTTP access log data. In other words, the techniques herein do not require content inspection of the certificate itself and can be used in real-time applications. Further, the techniques herein do not require the malware detection system to download the certificate itself, to determine whether the corresponding domain uses self-signed certificates.

While there have been shown and described illustrative embodiments that provide for the identification of self-signed certificates, it is to be understood that various other adaptations and modifications may be made within the spirit and scope of the embodiments herein. For example, while certain embodiments are described herein with respect to using certain models for purposes of malware detection, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving, at a device in a network, traffic information regarding one or more secure sessions in the network;
   associating, by the device, the one or more secure sessions with corresponding certificate validation check traffic indicated by the received traffic information;
   determining, by the device, that an endpoint domain used a self-signed certificate in a particular secure session of the one or more secure sessions based on the particular secure session not being associated with the certificate validation check traffic;
   making, by the device, a self-signed certificate determination for the endpoint domain of the particular secure session based on the determination that the endpoint domain used the self-signed certificate in the particular secure session; and
   causing, by the device, the self-signed certificate determination for the endpoint domain to be used as input to a malware detector.

2. The method as in claim 1, wherein the malware detector causes the performance of a mitigation action in the network when the malware detector detects malware.

3. The method as in claim 1, wherein the malware detector is configured to treat a self-signed certificate for a domain as an indication of the presence of malware in the network.

4. The method as in claim 1, wherein the traffic information regarding the one or more secure sessions comprises Hypertext Transfer Protocol (HTTP) access logs regarding HTTP traffic associated with the one or more secure sessions.

5. The method as in claim 1, wherein associating the one or more secure sessions with corresponding certificate validation check traffic comprises:
   matching, by the device, client addresses of the one or more secure sessions with client addresses of the certificate validation check traffic.

6. The method as in claim 1, wherein the certificate validation check traffic comprises a certificate revocation list (CRL) download or an Online Certificate Status Protocol (OCSP) check.

7. The method as in claim 1, wherein the self-signed certificate determination for the endpoint domain is based on whether any of the one or more secure sessions involving the endpoint domain are associated with certificate validation check traffic.

8. The method as in claim 1, wherein receiving the traffic information regarding the one or more secure sessions in the network comprises:
   capturing, by the device, the traffic information regarding the one or more secure sessions in the network.

9. An apparatus, comprising:
   one or more network interfaces to communicate with a network;
   a processor coupled to the network interfaces and configured to execute one or more processes; and
   a memory configured to store a process executable by the processor, the process when executed operable to:
      receive traffic information regarding one or more secure sessions in the network;
      associate the one or more secure sessions with corresponding certificate validation check traffic indicated by the received traffic information;
      determine that an endpoint domain used a self-signed certificate in a particular secure session of the one or more secure sessions based on the particular secure session not being associated with the certificate validation check traffic;
      make a self-signed certificate determination for the endpoint domain of the particular secure session based on the determination that the endpoint domain used the self-signed certificate in the particular secure session; and
      cause the self-signed certificate determination for the endpoint domain to be used as input to a malware detector.

10. The apparatus as in claim 9, wherein the malware detector causes the performance of a mitigation action in the network when the malware detector detects malware.

11. The apparatus as in claim 9, wherein the malware detector is configured to treat a self-signed certificate for a domain as an indication of the presence of malware in the network.

12. The apparatus as in claim 9, wherein the traffic information regarding the one or more secure sessions comprises Hypertext Transfer Protocol (HTTP) access logs regarding HTTP traffic associated with the one or more secure sessions.

13. The apparatus as in claim 9, wherein the apparatus associates the one or more secure sessions with corresponding certificate validation check traffic by:
   matching client addresses of the one or more secure sessions with client addresses of the certificate validation check traffic.

14. The apparatus as in claim 9, wherein the certificate validation check traffic comprises a certificate revocation list (CRL) download or an Online Certificate Status Protocol (OCSP) check.

15. The apparatus as in claim 9, wherein the self-signed certificate determination for the endpoint domain is based on whether any of the one or more secure sessions involving the endpoint domain are associated with certificate validation check traffic.

16. The apparatus as in claim 9, wherein the apparatus receives the traffic information regarding the one or more secure sessions in the network by:
- capturing the traffic information regarding the one or more secure sessions in the network.

17. A tangible, non-transitory, computer-readable medium storing program instructions that cause a device in a network to execute a process comprising:
- receiving, at the device, traffic information regarding one or more secure sessions in the network;
- associating, by the device, the one or more secure sessions with corresponding certificate validation check traffic indicated by the received traffic information;
- determining, by the device, that an endpoint domain used a self-signed certificate in a particular secure session of the one or more secure sessions based on the particular secure session not being associated with the certificate validation check traffic;
- making, by the device, a self-signed certificate determination for the endpoint domain of the particular secure session based on the determination that the endpoint domain used the self-signed certificate in the particular secure session; and
- causing, by the device, the self-signed certificate determination for the endpoint domain to be used as input to a malware detector.

* * * * *